United States Patent [19]

Manzouri

[11] Patent Number: 5,515,730

[45] Date of Patent: May 14, 1996

[54] APPARATUS FOR DETECTING THE AMPLITUDE, FREQUENCY OR MODES OF VIBRATION OF A VIBRATING PANEL

[75] Inventor: Shahamat Manzouri, Brough, Great Britain

[73] Assignee: British Aerospace PLC, Farnborough, Great Britain

[21] Appl. No.: 155,744

[22] Filed: Nov. 23, 1993

[30] Foreign Application Priority Data

Nov. 23, 1992 [GB] United Kingdom .................. 9224462
Oct. 2, 1993 [GB] United Kingdom .................. 9320713

[51] Int. Cl.⁶ .................................................. G01H 9/00
[52] U.S. Cl. .............................. 73/655; 356/374; 73/579
[58] Field of Search .............................. 73/579, 655, 656, 73/657; 356/374, 373, 376, 347

[56] References Cited

U.S. PATENT DOCUMENTS

| 3,245,307 | 4/1966 | Lang | 356/374 |
|---|---|---|---|
| 3,952,150 | 4/1976 | Gerardin et al. | 356/376 |
| 4,051,367 | 9/1977 | Sayce et al. | 356/373 |
| 4,125,025 | 11/1978 | Suzuki et al. | 73/655 |
| 4,136,568 | 1/1979 | Seymour | 73/655 |
| 4,978,222 | 12/1990 | Drew et al. | 356/374 |
| 5,075,562 | 12/1991 | Greivenkamp, Jr. et al. | 356/374 |
| 5,307,152 | 4/1994 | Boehnlein et al. | 356/376 |

FOREIGN PATENT DOCUMENTS

| 3932056 | 4/1991 | Germany . |
|---|---|---|
| 62-88149 | 4/1987 | Japan . |
| 939937 | 6/1982 | U.S.S.R. . |
| 1464046 | 3/1989 | U.S.S.R. . |
| 1209342 | 10/1970 | United Kingdom . |
| 1377611 | 12/1974 | United Kingdom . |
| 2130363 | 5/1984 | United Kingdom . |
| 2197466 | 5/1988 | United Kingdom . |

*Primary Examiner*—Hezron E. Williams
*Assistant Examiner*—Rose M. Finley
*Attorney, Agent, or Firm*—Cushman, Darby & Cushman

[57] ABSTRACT

Apparatus for detecting at least one of the amplitude, frequency and modes of vibration of a panel is described. Detection is achieved using Moire fringes by employing two diffraction gratings (33 and 38) through the first of which light is projected on to the panel. An array of photodiodes (40) is positioned behind the second diffraction grating (38) which receives light reflected from the panel. Signals from the photodiodes are analyzed in conventional ways to produce the required amplitude, frequency and mode information.

2 Claims, 3 Drawing Sheets

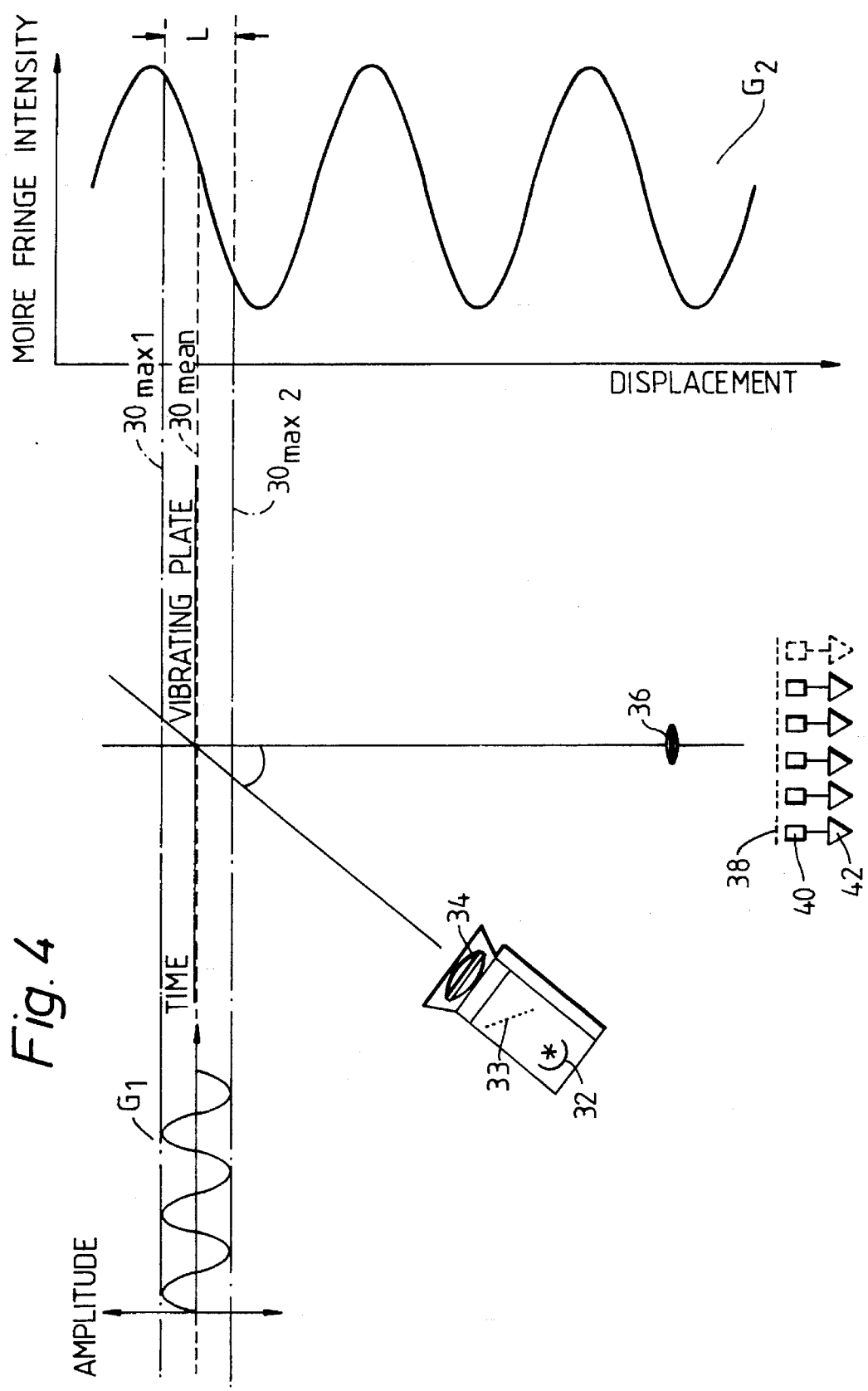

APPARATUS FOR DETECTING THE AMPLITUDE, FREQUENCY OR MODES OF VIBRATION OF A VIBRATING PANEL

BACKGROUND OF THE INVENTION

This invention relates to the analysis of vibrating panels, and more particularly to apparatus for detecting the amplitude, frequency or modes of vibration of a panel which is vibrating.

One conventional way of analysing vibrating panels, for example to test their ability to withstand certain types of treatment, consists of attaching accelerometers to the specimen panel in various places. The electrical signals produced by the accelerometers are recorded and analysed in a way known to those skilled in the art to produce the information required about the panel in question.

The accelerometers used in this type of testing are expensive, and many of them are required for a single testing operation. Thus, the testing is expensive and time consuming. Furthermore, in some cases such as the acoustic fatigue testing of vibrating panels in hot environments, it is not possible to use such techniques and a contactless system is required.

SUMMARY OF THE INVENTION

It is one object of the present invention to provide an alternative to accelerometers for analysing vibrating panels.

It is another object of the present invention to provide an alternative apparatus to accelerometers which, for a given stimulus, produces an output which is substantially identical to that produced by an accelerometer, thus allowing the same data logging equipment and computer programs to be used for analysis in each case.

Non-contact optical vibration measuring systems are known which use a technique which may be described as projection Moire interferometry. In this technique an image of a first grating is projected on to an object of interest and the reflection of the grating passed through a second grating to produce Moire fringes.

U.S. Pat. No. 4,125,025 for example, describes an optical, non-contact system for measuring the amplitude of vibration of a vibrating object. The system consists of an optical system which periodically projects the image of an optical grating onto the vibrating object and then reflects that image through a second grating onto photographic film. The interference between the image of the first grating and the second grating through which it passes produces a Moire fringe pattern on the photographic film. The frequency of projection of the image on to the object is controlled by a stroboscopic light source. When that frequency is matched to the frequency of vibration of the object the Moire fringe pattern on the exposed film indicates points on the object having equal amplitude of vibration. The problem with this arrangement is the difficulty of analysing the exposed film to obtain the required amplitude of vibration data. The method of analysis is not described in the patent.

GB Patent No. 1,377,611 describes a similar system to that of U.S. Pat. No. 4,125,025. This system again uses a projection Moire technique, a stroboscopic light source and a television or photographic camera to record the Moire fringes produced. Again the details of the analysis of the television or film record to determine vibration amplitude are not described.

It is accordingly a further object of the present invention to provide a projection Moire interferometry system the results of the use of which are readily compatible with computer analysis techniques.

According to the present invention there is provided apparatus for detecting at least one of the amplitude, frequency and modes of vibration of a panel, the apparatus comprising:

First diffraction grating means positioned for allowing electromagnetic radiation to pass there through and to be incident on said panel;

second diffraction grating means positioned for receiving said electromagnetic radiation when reflected from said panel; and electromagnetic radiation detection means positioned behind one face of said second diffraction grating for receiving a portion of said electromagnetic radiation reflected from said panel which passes through said second grating and for producing a plurality of signals indicative of the intensity of the electromagnetic radiation received on respective areas of said electromagnetic radiation detection means; wherein the orientations of said first and second diffraction gratings being such that at least one Moire fringe is produced when electromagnetic radiation is directed at said first diffraction grating means and the electromagnetic radiation detection means is so positioned behind one face of said second diffraction grating and for the orientations of said first and second diffraction grating that the resulting Moire fringe system is incident upon it said plurality of signals are produced.

The apparatus may comprise:

A first diffraction grating positioned for allowing light to pass there through and to be incident on said panel, a second diffraction grating positioned for receiving said light when reflected from said panel, the orientations of said first and second diffraction gratings being such that at least one Moire fringe is produced, light detection means positioned behind one face of said second diffraction grating for receiving a portion of said light reflected from said panel which passes through said second grating and producing a plurality of signals indicative of the intensity of the light received on respective areas of said light detection means, and wherein the angles of incidence and reflection of the light on and from the panel, the pitch and thickness of the lines of the first and second diffraction grating, and the sensitivity of the light detection means are predetermined such that in use throughout the possible range of movements of the panel, the intensity of said at least one Moire fringe varies substantially linearly and the magnitude of signals produced by the light detection means is substantially directly proportional to that intensity variation.

Preferably said light detection means comprises a plurality of photodiodes. The second diffraction grating may then comprise a corresponding plurality of gratings each adjustably positioned in front of a selected one of the photodiodes. The position of each grating may then be individually adjusted such that, with the panel at rest, the photodiodes produce signals of equal magnitude corresponding to the mid point of the linear range of intensities of the Moire fringes produced by the system.

Moire Fringes are formed when coherent light is incident on a diffraction grating and is viewed through another identical grating with matching line thickness and pitch. The spacing between the Moire fringes is dependent on the angle between the lines of the two gratings and their pitch.

If the lines of the diffraction gratings are held parallel to each other and one grating is displaced along a line normal to the lines, shades of grey are observed which vary cyclically as the displacement increases.

If the lines of one diffraction grating are projected on to a surface the observed lines can also be used to determine displacement of the surface normal to itself.

As the surface is moved away from the light source the projected lines on the surface move in one direction in the plane of the surface and as the surface moves towards the light they move in the opposite direction.

If the projected grating lines are then viewed through the reference grating the whole exposed surface area is observed as one shade of grey. As the surface moves towards or away from the light source cyclically varying shades of grey are observed. The intensity of the grey shade is a function of the magnitude of the displacement normal to the surface on to which the first grating lines are projected. A portion of each cyclical variation of intensity is substantially linear. The same result could also be obtained by moving the reference diffraction grating in a direction parallel to that surface, but for application of the effect to the analysis of vibrating panels it is the variation of intensity of the grey shade with displacement of the surface normal to itself which is of interest.

The intensity variation with displacement depends on the geometry of the system and the thickness and pitch of the projected and reference grating lines. It is important for our invention that this intensity variation is confined to the linear position referred to above. This in turn depends on knowledge of the expected range of the displacements of the panel when vibrating as will be explained in more detail below.

BRIEF DESCRIPTION OF THE DRAWINGS

For a better understanding of the invention an embodiment of it will now be described by way of a non-limiting example, with reference to the accompanying drawings in which:

FIG. 4 illustrates the operating range and geometry of the apparatus in FIG. 3.

DESCRIPTION OF THE PREFERRED EMBODIMENTS

Figure 1:
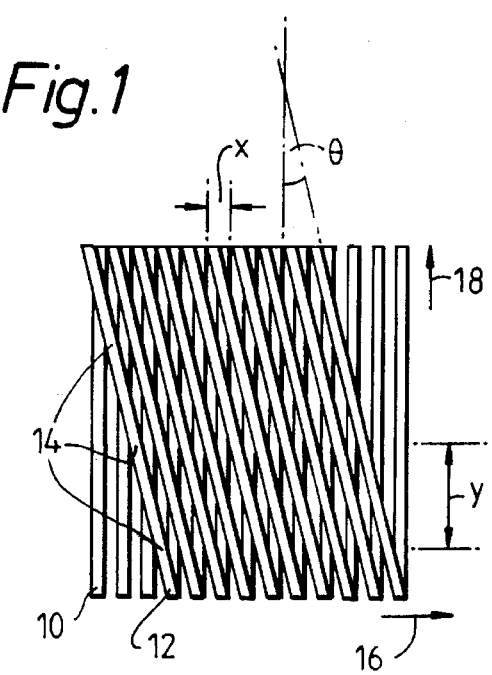
FIG. 1 shows a Moire fringe pattern produced by two gratings.

FIG. 1 shows the phenomenon of Moire fringes. Two transmission gratings 10, 12, each having alternate opaque and transparent linear elements (lines) of equal width and pitch x, are positioned face to face with their lines inclined at an angle $\theta$ relative to one another. If the gratings are positioned against a light background and exposed to a coherent light source a set of dark fringes 14 with pitch interval y extending transversely across the gratings can be seen. These fringes are called Moire fringes. For small angles $\theta$ it can be shown that $y=_\theta/^x$ which may be considered as a magnification factor.

If one of the gratings is moved transversely with respect to the other by a distance X, in the direction indicated by arrow 16, the Moire fringes 14 will move perpendicularly to the direction of movement of the grating by distance Y as indicated by arrow 18. Thus, Moire fringe displacement gives a magnified indication of the relative movement between the gratings; the degree of magnification being related to the angle of inclination, $\theta$.

Figure 2A:
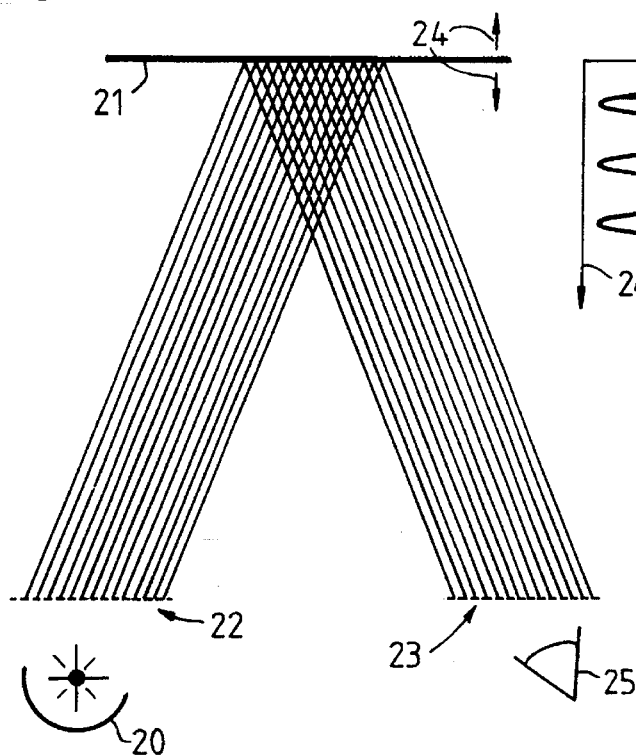
FIG. 2(a) and 2(b) illustrates projection Moire interferometry.

A variation of the arrangement is illustrated in FIG. 2a, where instead of the gratings being physically superimposed so that light passes directly through both, they are separated and light passing through one grating is reflected from an intermediate surface before passing through the second.

Figure 2B:
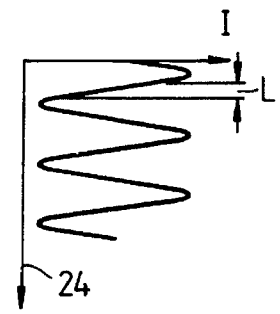

In FIG. 2(a) a light source 20 projects the lines of a transmission grating 22 on to a surface 21. The reflected light from the surface 21 is viewed at 25 through a reference grating 23. If the surface 21 is displaced in a direction normal to itself, as indicated by the arrows 24, the observed Moire fringe intensity, I, will vary with that displacement 24 as shown in FIG. 2(b). In theory the variation should produce a triangular plot, but, due to diffraction effects at grating line edges the plot appears, but is not, sinusoidal as shown in FIG. 2(b). In each cyclical variation of intensity a portion of the variation, indicated as 'L' is substantially linear, and this is of importance to our invention as will be explained below.

Figure 3:
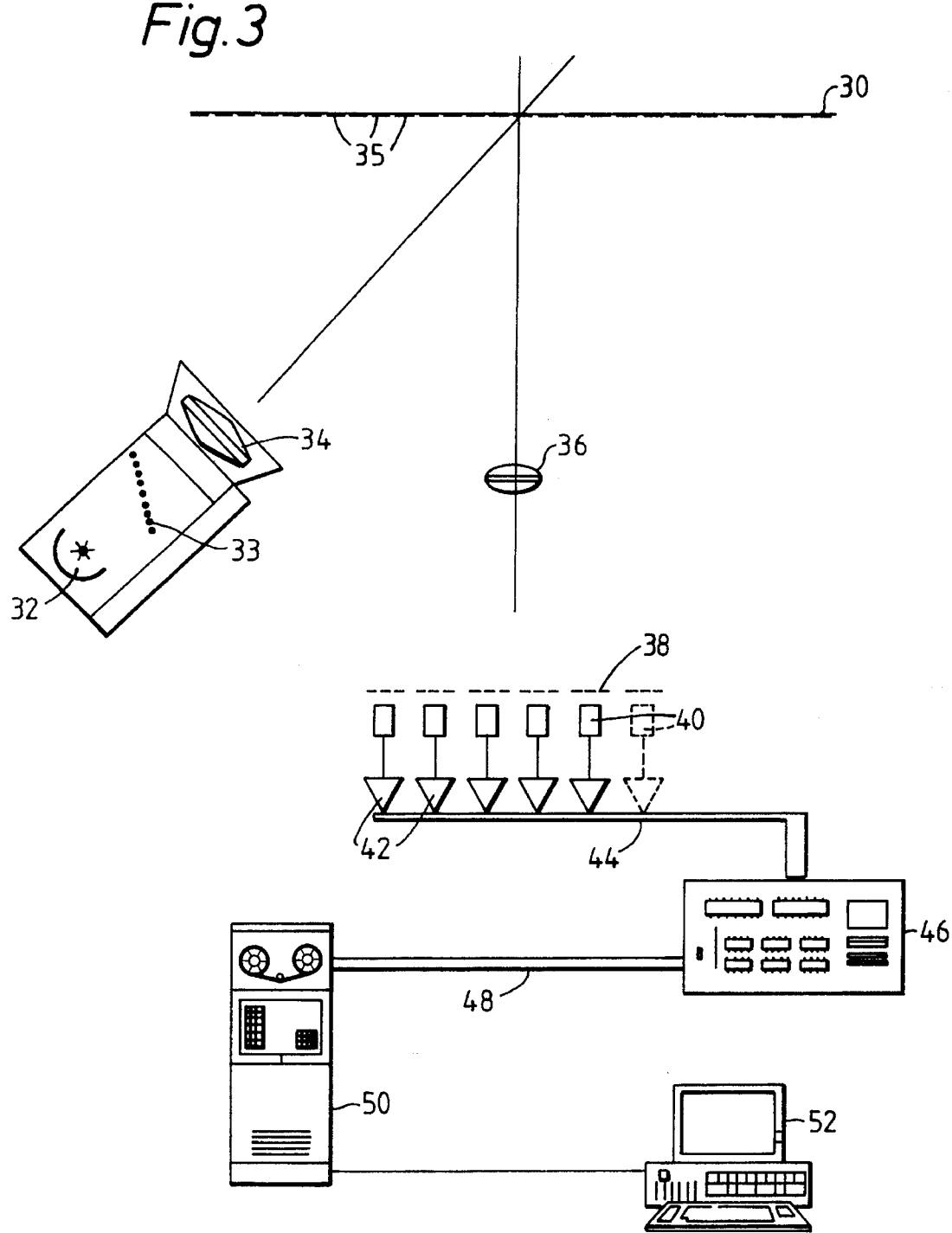
FIG. 3 shows a schematic diagram of apparatus used for analysing a vibrating panel.

FIG. 3 shows the application of the principles illustrated by FIGS. 2a and 2b to apparatus for analysing a panel 30. The analysis is carried out by vibrating the panel and using the principle of Moire fringes to determine the amplitude, frequency or modes of vibration of the panel 30. The apparatus includes a light source 32 which directs light at diffraction grating 33, a portion of which passes through the grating and lens 34, thereby forming a pattern of parallel light and dark lines 35 on vibrating panel 30. For example, the light source 32 and lens 34 could be provided in the form of a conventional slide projector.

A second lens 36 is positioned for receiving light reflected from the panel 30 and focusing the light on second, reference, individual diffraction gratings 38. The two diffraction gratings 33 and 38 are orientated such that at least one Moire fringe is produced—the lateral position of the fringe(s) being proportioned to the out of height deformation of the panel. A two dimensional array of photodiodes 40, each having its own dedicated pre-amplifier 42 such that the amplification is matched with the profile of the Moire fringes viewed by the diodes. The output signals from each of the pre-amplifiers 42 are passed via screened cable 44 to amplifiers 46. Signals from the amplifiers 46, being representative of the strength of the light detected by each of the photodiodes, are transmitted in parallel along cable 48 to data logger 50. A computer 52 running a program for analysing the photodiode data and deriving the frequency, amplitude and modes of vibration of the panel 30 receives data from data logger 50. The computer program could be of the type used in conventional methods of analysing vibrating panels using accelerometers.

In FIG. 4 the initial set up of the apparatus is illustrated. The panel is expected to vibrate about a mean position 30 mean, reaching a maximum displacement position in one direction, 30 max. 1, and a maximum displacement direction in other direction 30 max. 2. The oscillation of the panel is shown in the amplitude vs. time graph G1. As the panel vibrates the Moire fringe intensity will vary cyclically as described above, but the geometry of the systems such that movements of the panel from 30 max. 1 system is chosen so that panel displacements from 30 max. 1 to 30 max. 2 correspond to the linear range L of intensity variations. (See the projections of 30 max. 1 and 30 max. 2 on to the displacement vs. intensity graph G2).

In the example shown in FIG. 3 and 4 the reference diffraction grating 38 is in fact a plurality of individually adjustable gratings 38 each associated with a particular one of the photodiodes 40. Movement of a grating 38 parallel to the panel 30 has the effect of moving the Moire fringe pattern G2 laterally also. Before the panel 30 is made to vibrate i.e. in its rest position 30 mean, the position of each grating 38 is adjusted so that the intensity of the Moire fringe falling on each photodiode 40 is identical and corresponds to the mid point of the linear range 'L' of intensity variations shown in G2.

In the event that all points on the panel 30 move identically when the panel is vibrating the output of the photodiodes will be correspondingly identical. However this will not normally occur in practice. The outputs of the photodiodes will provide an indication of the variation of behaviour of the panel 30 under vibration and the computer 52 provides and analysis of this behavioural variation.

What is claimed is:

1. Apparatus for detecting at least one of the amplitude, frequency and modes of vibration of a panel, the apparatus comprising:

a light source;

first diffraction grating means positioned for allowing light to pass therethrough and be incident on said panel;

second diffraction grating means positioned for receiving light reflected from said panel, the orientations of said first and second diffraction gratings being such that at least one Moiré Fringe is produced; and a plurality of photodiodes positioned behind one face of said second diffraction grating means for receiving a portion of said light reflected from said panel which passes through said second grating means and for producing a plurality of signals indicative of an intensity of light received on respective areas of said plurality of photodiodes, wherein angles of incidence and reflection of light on and from the panel, a pitch and thickness of lines of the first and second diffraction grating means, and a sensitivity of the plurality of photodiodes are predetermined such that in use, throughout the possible range of movements of the panel, the intensity of said at least one Moiré Fringe varies substantially linearly and the magnitude of signals produced by the plurality of photodiodes is substantially directly proportional to that intensity variation, and wherein the second diffraction grating means comprises a corresponding plurality of gratings each adjustably positioned in front of a selected one of the plurality of photodiodes.

2. Apparatus for detecting at least one of the amplitude, frequency and modes of vibration of a panel characterized in that, the apparatus comprising:

a light source;

first diffraction grating means positioned for allowing light from said light source to pass therethrough and be incident on said panel;

a second diffraction grating means for receiving light reflected from said panel;

the orientations of said first and second diffraction gratings being such that at least one Moiré Fringe is produced when light is directed at said first diffraction grating means; and a plurality of photodiodes arranged to receive a portion of said light reflected from said panel which passes through said second grating and for producing a plurality of signals indicative of an intensity of light received on respective ones of said plurality of photodiodes, and so positioned behind one face of said second diffraction grating means that the resulting Moiré Fringe system is incident upon said plurality of photodiodes, and wherein the second diffraction grating means comprises a corresponding plurality of gratings each adjustably positioned in front of a selected one of said plurality of photodiodes.

* * * * *